(12) United States Patent
Konno et al.

(10) Patent No.: US 11,326,669 B2
(45) Date of Patent: May 10, 2022

(54) CHAIN TENSIONER AND TENSIONER BODY

(71) Applicant: TSUBAKIMOTO CHAIN CO., Osaka (JP)

(72) Inventors: Masahiko Konno, Osaka (JP); Koichi Shimosaka, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 229 days.

(21) Appl. No.: 16/599,553

(22) Filed: Oct. 11, 2019

(65) Prior Publication Data

US 2020/0116238 A1   Apr. 16, 2020

(30) Foreign Application Priority Data

Oct. 16, 2018 (JP) .............................. JP2018-195251

(51) Int. Cl.
*F16H 7/08* (2006.01)
*F16H 7/18* (2006.01)

(52) U.S. Cl.
CPC ................. *F16H 7/08* (2013.01); *F16H 7/18* (2013.01); *F16H 2007/0842* (2013.01); *F16H 2007/0872* (2013.01)

(58) Field of Classification Search
CPC ............... F16H 7/08; F16H 2007/0878; F16H 2007/0872; F16H 2007/0812
USPC .................................................. 474/111, 110
See application file for complete search history.

(56) References Cited

U.S. PATENT DOCUMENTS

| 4,713,043 | A | * | 12/1987 | Biedermann | F16H 7/0848 474/111 |
| 4,904,230 | A | * | 2/1990 | Kawashima | F16H 7/1236 474/112 |
| 5,033,992 | A | * | 7/1991 | Ojima | F16H 7/08 474/111 |
| 5,352,160 | A | * | 10/1994 | Sakai | F16H 7/1227 474/117 |
| 5,676,614 | A | * | 10/1997 | Inoue | F16H 7/08 474/110 |
| 5,885,179 | A | * | 3/1999 | Lewis | F16H 7/0848 474/110 |
| 5,931,754 | A | * | 8/1999 | Stief | F16H 7/0848 474/109 |
| 5,989,138 | A | * | 11/1999 | Capucci | F16H 7/08 474/109 |

(Continued)

FOREIGN PATENT DOCUMENTS

| JP | 2006-132761 A | 5/2006 |
| JP | 2010-107021 A | 5/2010 |
| JP | 2015-7467 A | 1/2015 |

*Primary Examiner* — Henry Y Liu
(74) *Attorney, Agent, or Firm* — Westerman, Hattori, Daniels & Adrian, LLP

(57) ABSTRACT

An object of the present invention is to provide a chain tensioner that can prevent breakage or deformation of its components during transport or storage, prevent wrong assembly, and increase the degree of design freedom. The chain tensioner includes a guide lever supported pivotably on an arm part that is provided to a tensioner body. The tensioner body has a body-side fixing pin hole positioned for a stopper pin to pass through without extending through the plunger. The guide lever has a lever-side fixing pin hole that comes to be coaxial with the body-side fixing pin hole in a predetermined pivoting position.

6 Claims, 23 Drawing Sheets

(56) References Cited

U.S. PATENT DOCUMENTS

| | | | | |
|---|---|---|---|---|
| 5,989,139 A * | 11/1999 | Dusinberre, II | | F16H 7/08 474/110 |
| 6,093,123 A * | 7/2000 | Baddaria | | F01L 1/02 474/110 |
| 6,238,311 B1 * | 5/2001 | Cutting | | F16H 7/08 474/109 |
| 6,244,981 B1 * | 6/2001 | Simpson | | F16H 7/0848 474/110 |
| 6,312,351 B1 * | 11/2001 | Simpson | | F16H 7/0848 474/109 |
| 6,406,391 B1 * | 6/2002 | Ullein | | F16H 7/08 111/133 |
| 6,447,415 B1 * | 9/2002 | Hashimoto | | F16H 7/08 474/109 |
| 6,454,672 B2 * | 9/2002 | Kurohata | | F16H 7/0836 474/111 |
| 8,387,244 B2 * | 3/2013 | Markley | | F01L 1/022 29/888.01 |
| 8,672,785 B2 * | 3/2014 | Young | | F16H 7/08 474/111 |
| 9,523,413 B2 * | 12/2016 | Kurematsu | | F16H 7/08 |
| 10,781,893 B2 * | 9/2020 | Monsy | | F16H 7/08 |
| 10,995,829 B2 * | 5/2021 | Dec | | F16H 7/1281 |
| 2001/0039223 A1 * | 11/2001 | Wakabayashi | | F16H 7/08 474/111 |
| 2002/0002090 A1 * | 1/2002 | Koch | | F16H 7/08 474/101 |
| 2005/0049093 A1 * | 3/2005 | Sato | | F16H 7/0836 474/101 |
| 2005/0054467 A1 * | 3/2005 | Le | | F16H 7/18 474/111 |
| 2006/0046882 A1 * | 3/2006 | Assel | | F16H 7/08 474/111 |
| 2006/0084537 A1 * | 4/2006 | Matsushita | | F16H 7/0836 474/109 |
| 2006/0094548 A1 * | 5/2006 | Sato | | F16H 7/0848 474/109 |
| 2006/0100048 A1 * | 5/2006 | Wake | | F16H 7/0831 474/111 |
| 2006/0234819 A1 * | 10/2006 | Markley | | F16H 7/0848 474/111 |
| 2007/0021251 A1 * | 1/2007 | Redaelli | | F16H 7/08 474/109 |
| 2007/0082773 A1 * | 4/2007 | Yamada | | F16H 7/0848 474/109 |
| 2008/0280710 A1 * | 11/2008 | Fuhrmann | | F16H 7/08 474/109 |
| 2009/0111629 A1 * | 4/2009 | Kobara | | F02B 67/06 474/111 |
| 2009/0205206 A1 * | 8/2009 | Markley | | F16H 7/08 29/888.01 |
| 2010/0022338 A1 * | 1/2010 | Botez | | F16H 7/08 474/111 |
| 2010/0035712 A1 * | 2/2010 | Hartmann | | F16H 7/1281 474/110 |
| 2010/0222167 A1 * | 9/2010 | Chekansky | | F16H 7/0836 474/110 |
| 2011/0015014 A1 * | 1/2011 | Kroon | | F16H 7/08 474/110 |
| 2011/0028253 A1 * | 2/2011 | Perissinotto | | F16H 7/0848 474/135 |
| 2012/0040790 A1 * | 2/2012 | Perissinotto | | F16H 7/08 474/110 |
| 2013/0190117 A1 * | 7/2013 | Bauer | | F16H 7/08 474/111 |
| 2014/0179471 A1 * | 6/2014 | Markley | | F16H 7/0836 474/110 |
| 2015/0005120 A1 * | 1/2015 | Kurematsu | | F16H 7/08 474/111 |
| 2015/0345596 A1 * | 12/2015 | Lindner | | F16H 7/0836 474/111 |
| 2015/0354674 A1 * | 12/2015 | Markley | | F16H 7/0848 474/110 |
| 2016/0252166 A1 * | 9/2016 | Noro | | F16H 7/08 474/111 |
| 2016/0252167 A1 * | 9/2016 | Guyot | | F16H 7/08 474/111 |
| 2017/0067545 A1 * | 3/2017 | Zeccara | | F16H 7/08 |
| 2017/0363181 A1 * | 12/2017 | Freemantle | | F16H 7/0848 |
| 2017/0370447 A1 * | 12/2017 | Freemantle | | F16H 7/0848 |

* cited by examiner

CHAIN TENSIONER AND TENSIONER BODY

BACKGROUND OF THE INVENTION

1. Field of the Invention

The present invention relates to a chain tensioner including a tensioner body having a plunger bore, a plunger slidably fitted in the plunger bore, an arm part provided to the tensioner body, and a guide lever pressed by the plunger and supported pivotably on the arm part.

2. Description of the Related Art

Chain tensioners that maintain correct tension of chains are commonly used. A chain guide mechanism slidably guides a drive chain, for example, such as an endless roller chain passing over respective sprockets of a crankshaft and a cam shaft, or of a crankshaft and a drive shaft of an auxiliary machine inside an engine room, with a guide lever. It is known to press a pivoting chain guide having the guide lever with a chain tensioner to maintain correct tension.

It is sometimes necessary for such a chain guide mechanism to install a device that maintains correct tension in the chain between closely spaced shafts (such as a crankshaft and a drive shaft of an auxiliary machine that are often placed closely together) or in a place with limited peripheral space.

For such application, there is known a compact integrated chain tensioner, with an arm part provided to the tensioner body and a guide lever with a shoe supported directly and pivotably on the arm part.

Generally, the common structure for supporting a guide lever directly and pivotably on the arm part is a through hole formed both in the guide lever and the arm part and a shaft member passed through these through holes. This structure, however, requires a large number of components, and a large number of process steps during assembly such as alignment of the through holes, insertion of the shaft member, and retention of the shaft member, etc.

An alternative structure has been proposed to reduce the number of components and to simplify the assembling process (see Japanese Patent Application Laid-open Nos. 2010-107021 and 2006-132761), wherein one of the arm part and the guide lever has a pivot part to mate with a pivot support part formed on the other so that no separate shaft member is used.

Yet another structure has been proposed wherein the pivot part of the arm part and the pivot support part of the guide lever are constructed suitably to reduce the number of components and to simplify the assembling process, as well as to prevent displacement and looseness to stabilize the chain and to reduce the possibility of wear and breakage for better durability (see Japanese Patent Application Laid-open No. 2015-7467).

SUMMARY OF THE INVENTION

After the assembly, it is necessary for the known chain tensioners mentioned above to retain the plunger compressed until the tensioner is fixed in position in an engine or the like to be used and ready to actually apply tension to a chain or the like.

Japanese Patent Application Laid-open Nos. 2010-107021 and 2006-132761 do not mention such retention of the plunger. Generally, a stopper pin or the like is inserted from a side face of the plunger body to engage with the plunger to stop the plunger from coming out.

The tensioner described in Japanese Patent Application Laid-open No. 2015-7467 uses a stopper pin for retaining the plunger also for stopping the guide lever from rotating.

When the plunger only is retained, the guide lever can still rotate relative to the tensioner body, and it is possible that the guide lever repeatedly hits the plunger during transport and causes deformation or breakage. When the tensioner is wrongly assembled to the engine with the guide lever largely opened, it may fail to operate correctly as the lever may hinder the running of the chain.

By retaining both of the plunger and the guide lever, the problems described above such as the guide lever hitting and causing deformation or breakage, or the wrong assembling of the tensioner to the engine can be avoided.

However, the stopper pin that retains the plunger in a compressed state receives a large bending stress. As a large friction resistance is generated when the stopper pin is pulled out, the pulling out of the stopper pin could be a large burden. Also when the stopper pin is pulled out, the plunger surface may be scratched.

If the stopper pin does not have sufficient rigidity, it may yield to the outward force of the plunger and bend, in which case the stopper pin cannot be pulled out.

The present invention solves these problems, its object being to provide a chain tensioner having a guide lever and a tensioner body integrated with each other and capable of preventing breakage or deformation of its components during transport or storage, preventing wrong assembly, and increasing the degree of design freedom.

The invention set forth in claim 1 solves the problems described above by providing a chain tensioner including a tensioner body having a plunger bore, a plunger slidably fitted in the plunger bore, an arm part provided to the tensioner body, and a guide lever pressed by the plunger and supported pivotably on the arm part, wherein the arm part has a pivot part at a distal end thereof, the guide lever has a pivot support part pivotally supported by the pivot part, the tensioner body includes a body-side fixing pin hole positioned for a stopper pin to pass through without extending through the plunger, and the guide lever includes a lever-side fixing pin hole that comes to be coaxial with the body-side fixing pin hole at a predetermined pivoting position.

According to the chain tensioner set forth in claim 1 and the tensioner body set forth in claim 7, the guide lever is locked to the tensioner body by the stopper pin, and the guide lever retains the plunger compressed. Therefore, deformation or breakage of the guide lever or plunger caused by the guide lever repeatedly hitting the plunger during transport can be prevented reliably.

Since the assembling work of the chain tensioner can be carried out with both of the guide lever and the plunger being retained to the tensioner body, wrong assembling of the tensioner can be prevented.

Since the plunger need not be retained directly by the stopper pin, it is possible to form pin holes in optimal positions in accordance with space limitations or other conditions of the engine, i.e., a high degree of design freedom is achieved. Moreover, since the stopper pin does not make contact with the plunger, the plunger will stay intact and can reliably exhibit the intended functions of the chain tensioner.

According to the configurations set forth in claims 2 to 5, in addition to the effects noted above, it is made easier to form a locking structure wherein at least one of the body-side fixing pin hole and the lever-side fixing pin hole is positioned on both sides of the other, while the assembling ease of the chain tensioner is retained. In such a locking structure, the stopper pin is passed through two or more components, so that deformation, such as twisting, of the guide lever, due to the outward force of the plunger during the transport can be prevented reliably. The structure also makes it easy to align the lever-side fixing pin hole with the body-side fixing pin hole so that the stopper pin can be inserted and pulled out easily.

According to the configuration set forth in claim 6, the guide lever can be restricted in its movement in the thrust direction (perpendicular to the running chain) so that the running chain can be supported stably, and irregular wear or the like on the running surface can be prevented. Deformation such as twisting of the guide lever due to the outward force of the plunger during the transport can also be prevented.

Moreover, since the rigidity of the arm part of the tensioner body can be increased, the chain tensioner can be configured to be suitable for high-load engines.

DESCRIPTION OF THE PREFERRED EMBODIMENTS

Figure 1:
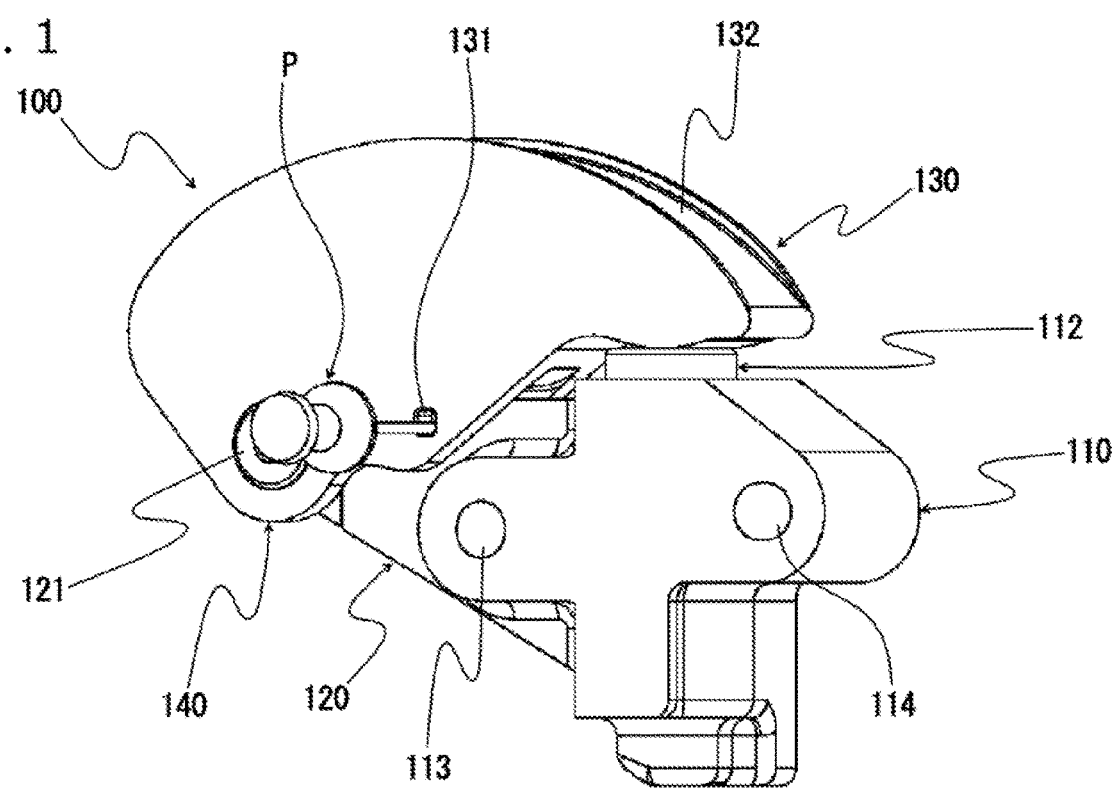
FIG. 1 is a perspective view of a chain tensioner viewed from the front according to a first embodiment of the present invention.
Figure 2:
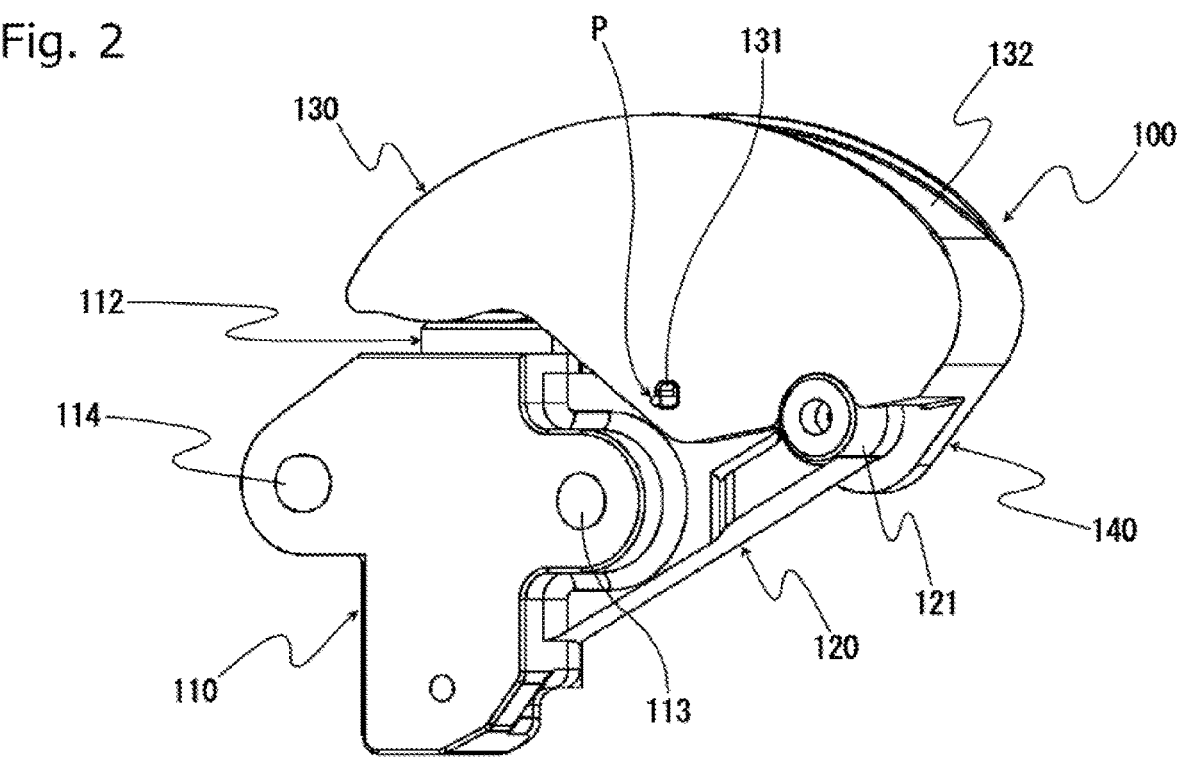
FIG. 2 is a perspective view of the chain tensioner viewed from the back according to the first embodiment of the present invention.
Figure 3:
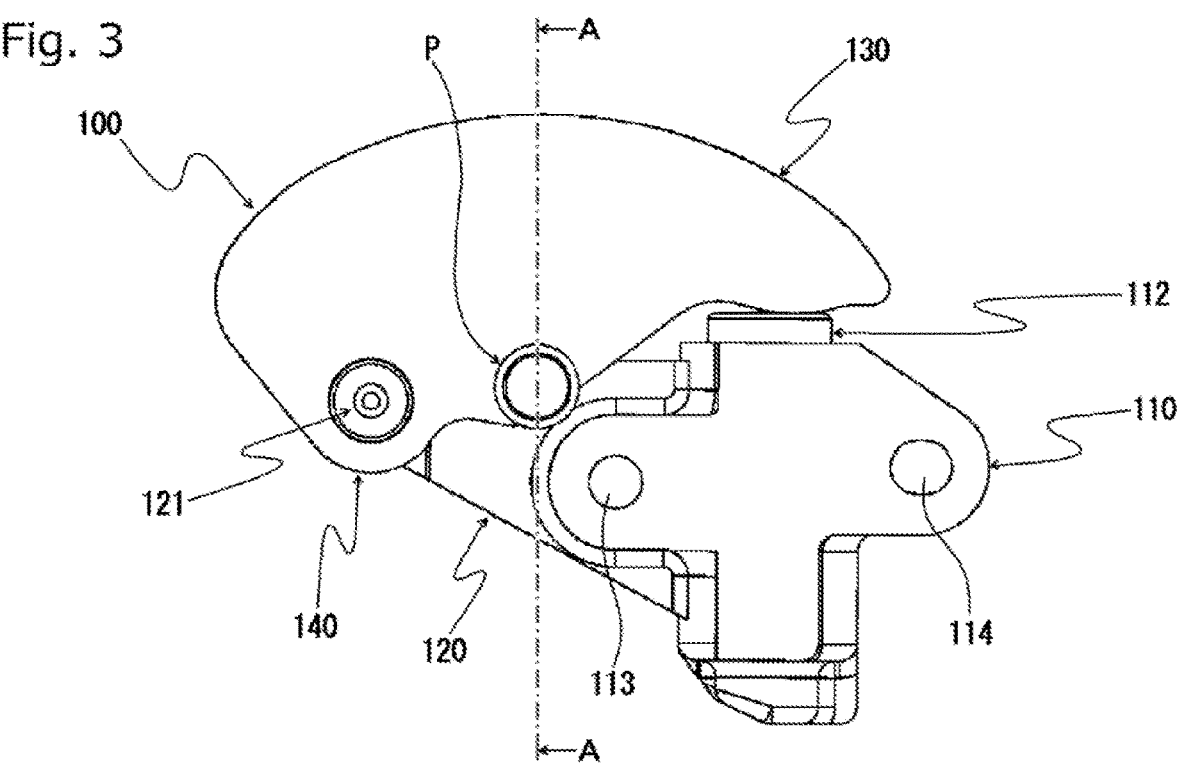
FIG. 3 is a front view of the chain tensioner according to the first embodiment of the present invention.
Figure 4:
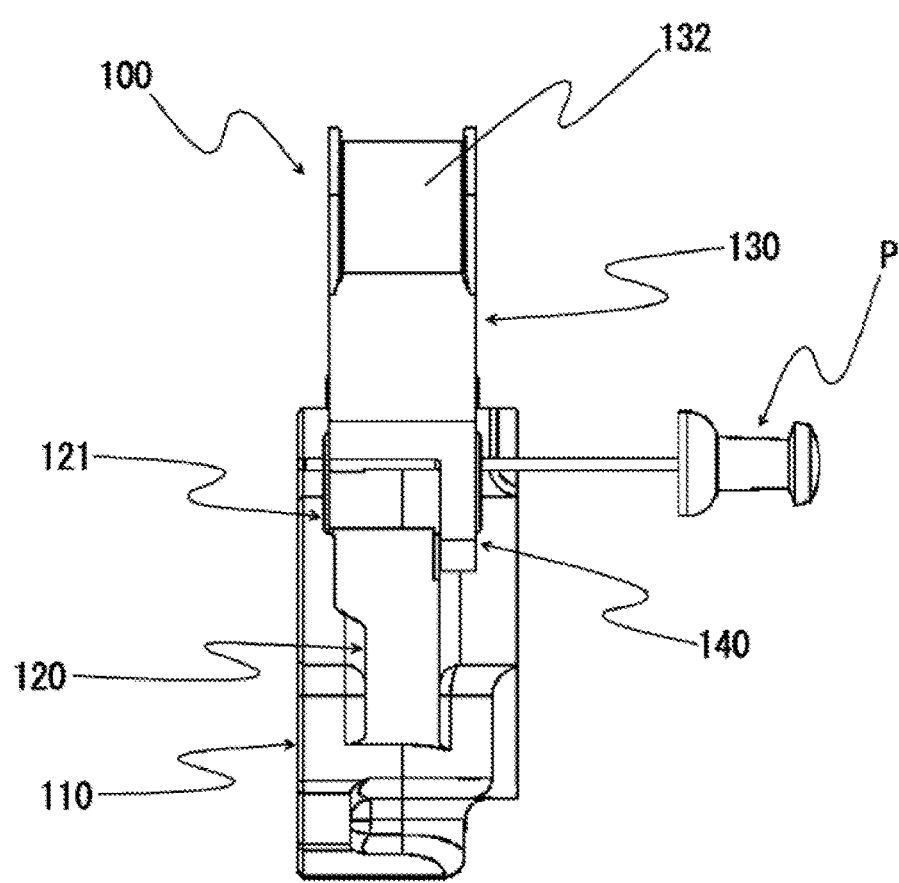
FIG. 4 is a side view of the chain tensioner according to the first embodiment of the present invention.
Figure 5:
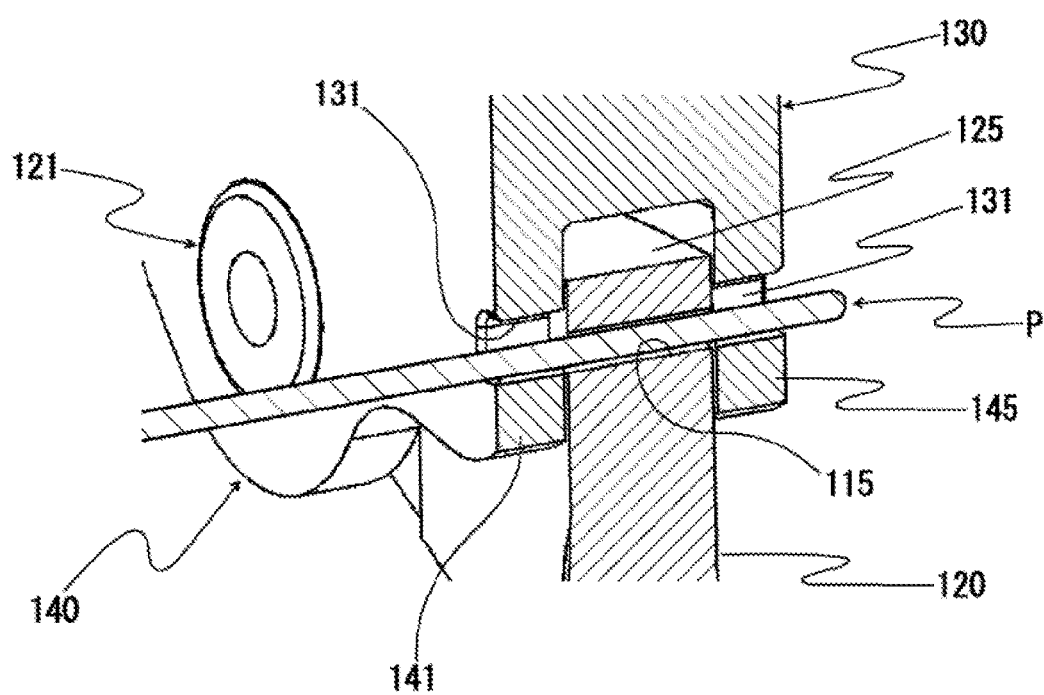
FIG. 5 is a cross-sectional perspective view showing an A-A section of FIG. 3.

The chain tensioner according to the present invention includes a tensioner body having a plunger bore, a plunger slidably fitted in the plunger bore, an arm part provided to the tensioner body, and a guide lever pressed by the plunger and supported pivotably on the arm part, and may have any specific form as long as: the arm part has a pivot part at a distal end thereof, the guide lever has a pivot support part pivotally supported by the pivot part, the tensioner body includes a body-side fixing pin hole positioned for a stopper pin to pass through without extending through the plunger, and the guide lever includes a lever-side fixing pin hole that comes to be coaxial with the body-side fixing pin hole at a predetermined pivoting position.

Embodiment 1

The chain tensioner 100 according to a first embodiment of the present invention includes a tensioner body 110 having a plunger bore 111, a plunger 112 slidably fitted in the plunger bore 111, an arm part 120 provided to the tensioner body 110, and a guide lever 130 that is pressed by the plunger 112 and supported pivotably on the arm part 120, as shown in FIG. 1 to FIG. 7.

Figure 6:
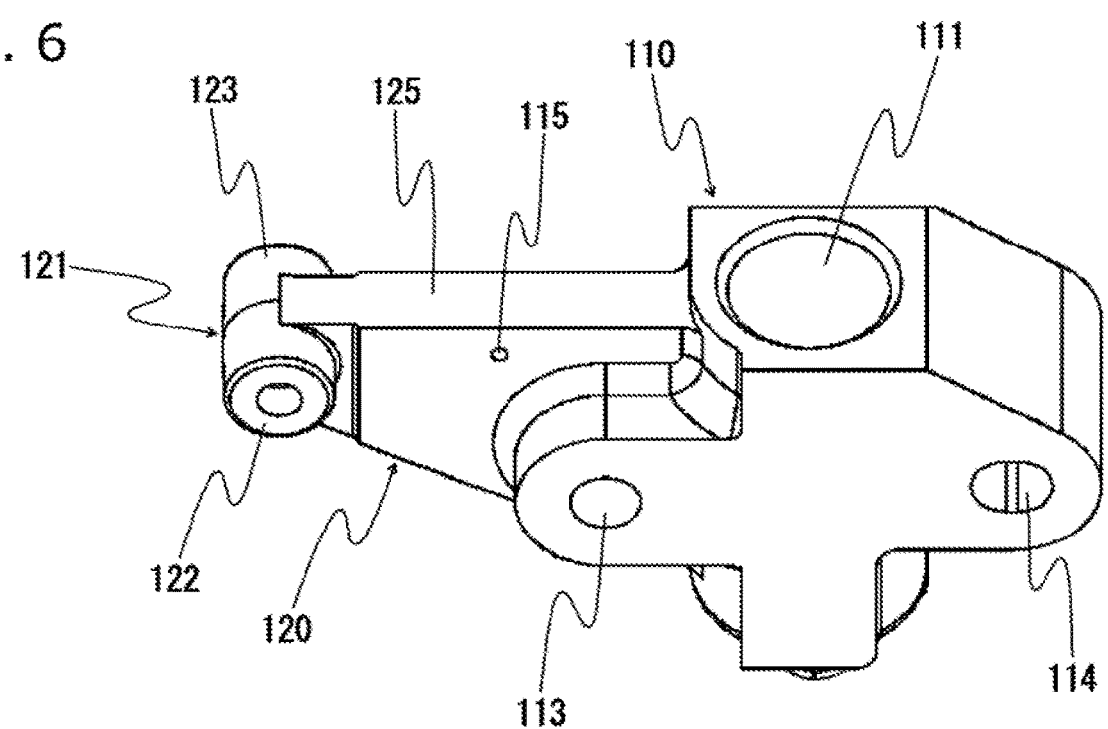
FIG. 6 is a perspective view of a tensioner body according to the first embodiment of the present invention.

The tensioner body 110 has mounting holes 113 and 114 as shown also in FIG. 6 for a bolt or the like to pass through for attachment to the inside of an engine room or the like. The arm part 120 extends laterally further from one mounting hole 113.

The arm part 120 has a pivot part 121 at the distal end. The pivot part 121 includes a first shaft 122 extending from the distal end of the arm part 120 to one lateral side in the width direction of the chain, and a second shaft 123 extending to the other lateral side.

The guide lever 130 has a running chain guide surface 132 on the front side for slidably guiding a running chain along a longitudinal guiding direction.

Figure 7:
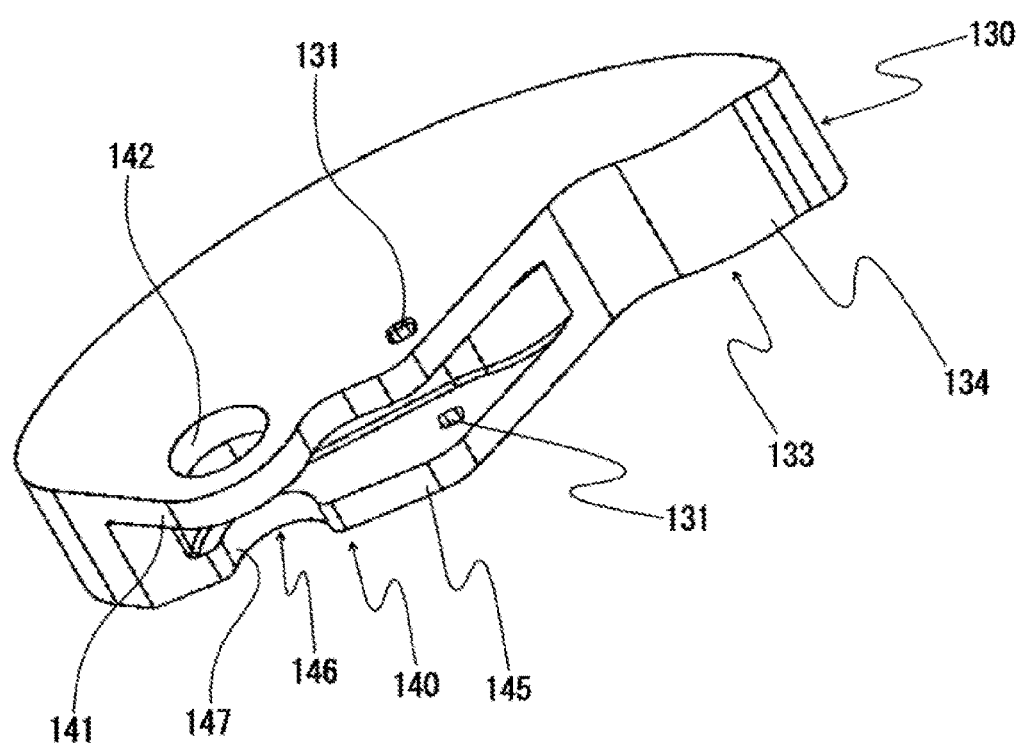
FIG. 7 is a perspective view of a guide lever according to the first embodiment of the present invention.

The guide lever 130 has a plunger abutment part 133 with a convex plunger abutting surface 134, and a pivot support part 140 pivotally supported by the pivot part 121 of the tensioner body 110 on the backside as shown also in FIG. 7.

The pivot support part 140 has a pair of guide plate portions 141 and 145 opposite each other such that they sandwich a plate-like locking plate 125 of the arm part 120, one guide plate portion 141 having a mating hole 142 in an end portion thereof for a first shaft 122 of the pivot part 121 to fit in. The other guide plate portion 145 has a guide part 146 opposite the mating hole 142 to be guided by part of the second shaft 123. The guide part 146 has a semi-circular guide surface 147 that abuts directly on the second shaft 123 and is guided as it slides thereon.

The chain tensioner 100 of this embodiment is provided with a body-side fixing pin hole 115 for a stopper pin P to pass through in the locking plate 125 of the arm part 120 of the tensioner body 110 positioned between the plunger bore 111 and the pivot part 121. The guide lever 130 is provided with lever-side fixing pin holes 131, 131, one each in each of the pair of guide plate portions 141, 145, which come to be coaxial with the body-side fixing pin hole 115 at a predetermined pivoting position.

As shown in FIG. 1 to FIG. 5, the chain tensioner 100 of this embodiment is configured such that both the plunger 112 and the guide lever 130 can be fixed to the tensioner body 110 during assembly, storage, transport and so on, with the stopper pin P being inserted to the body-side fixing pin hole 115 and the lever-side fixing pin holes 131, 131. More specifically, with the stopper pin P inserted to the body-side fixing pin hole 115 and the lever-side fixing pin holes 131, 131, the guide lever 130 is locked to the tensioner body 110 by the stopper pin P, and the guide lever 130 retains the plunger 112 compressed.

The body-side fixing pin hole 115 and the lever-side fixing pin holes 131 both have a larger hole diameter than the outer diameter of the pin material of the stopper pin P, so that the pin material of the stopper pin P is loosely fitted in the body-side fixing pin hole 115 and the lever-side fixing pin holes 131.

The chain tensioner 100 according to the first embodiment of the present invention thus configured can be easily assembled, by fitting the first shaft 122 in the mating hole 142 from one side at an angular position where the guide part 146 does not interfere with the arm part 120, and turning the guide lever 130 onto the plunger 112.

At the operating position where the plunger abutment surface 134 of the guide lever 130 is in contact with the plunger 112, the arm part 120 is located between the pair of guide plate portions 141 and 145 of the guide lever 130 to restrict the movement of the guide lever 130 in the width direction, so that the guide lever 130 is prevented from coming off.

Embodiment 2

The chain tensioner according to a second embodiment of the present invention has substantially the same configuration as that of the chain tensioner 100 according to the first embodiment described above except that the stopper pin retains the guide lever in a different position.

Figure 8:
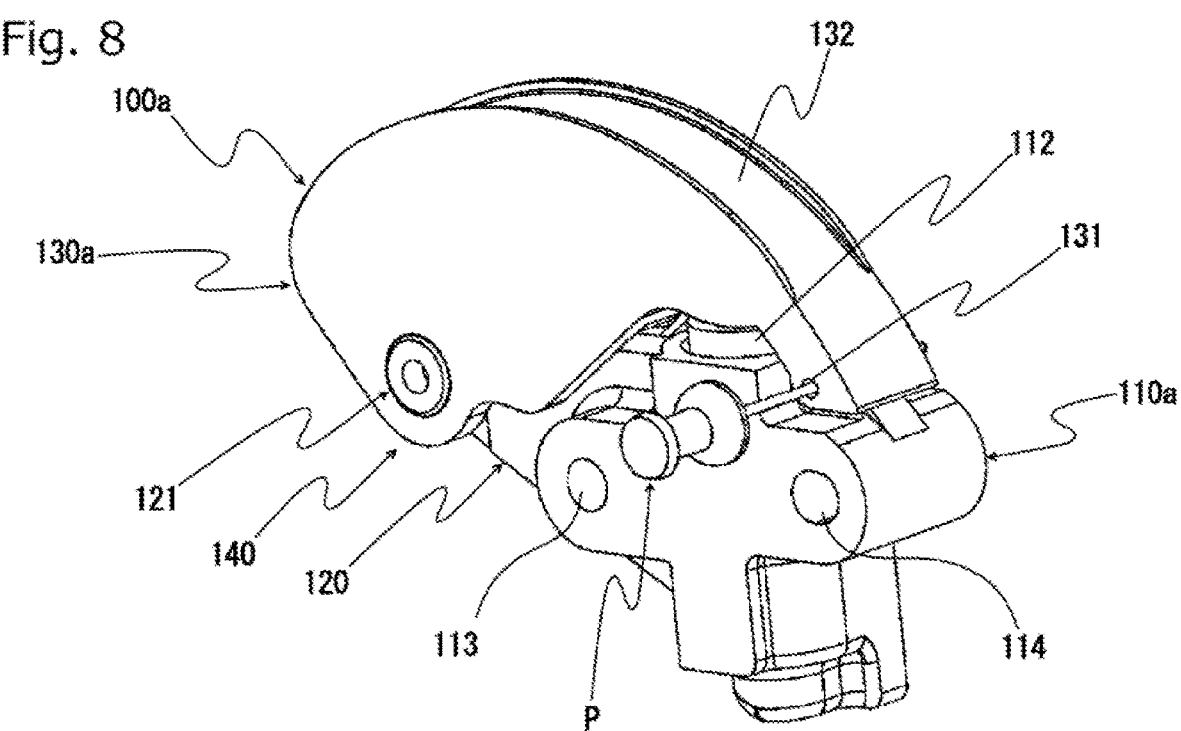
FIG. 8 is a perspective view of a chain tensioner viewed from the front according to a second embodiment of the present invention.
Figure 9:
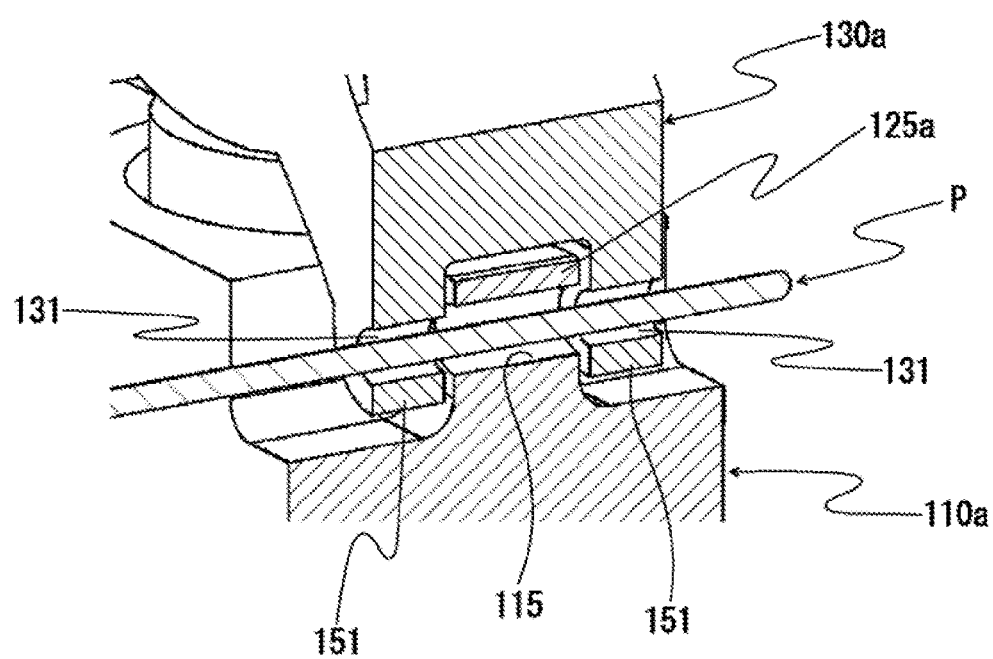
FIG. 9 is a cross-sectional perspective view illustrating part of the chain tensioner according to the second embodiment of the present invention.

In the chain tensioner 100a according to the second embodiment, as shown in FIG. 8 and FIG. 9, the stopper pin P for retaining the guide lever 130a is positioned on the opposite side of the plunger bore 111 of the tensioner body 110a from the arm part 120.

Figure 10:
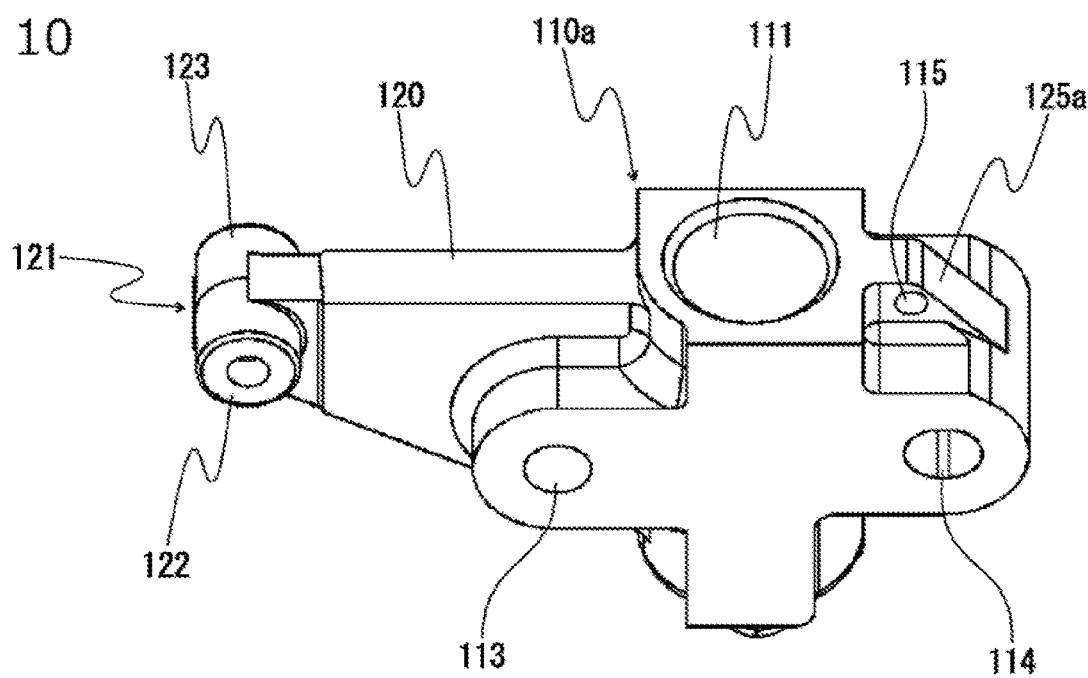
FIG. 10 is a perspective view of a tensioner body according to the second embodiment of the present invention.

The tensioner body 110a includes a locking plate 125a on the opposite side of the plunger bore 111 from the arm part 120, as shown in FIG. 10, in addition to the configuration of the tensioner body 110 of the chain tensioner 100 according to the first embodiment.

Figure 11:
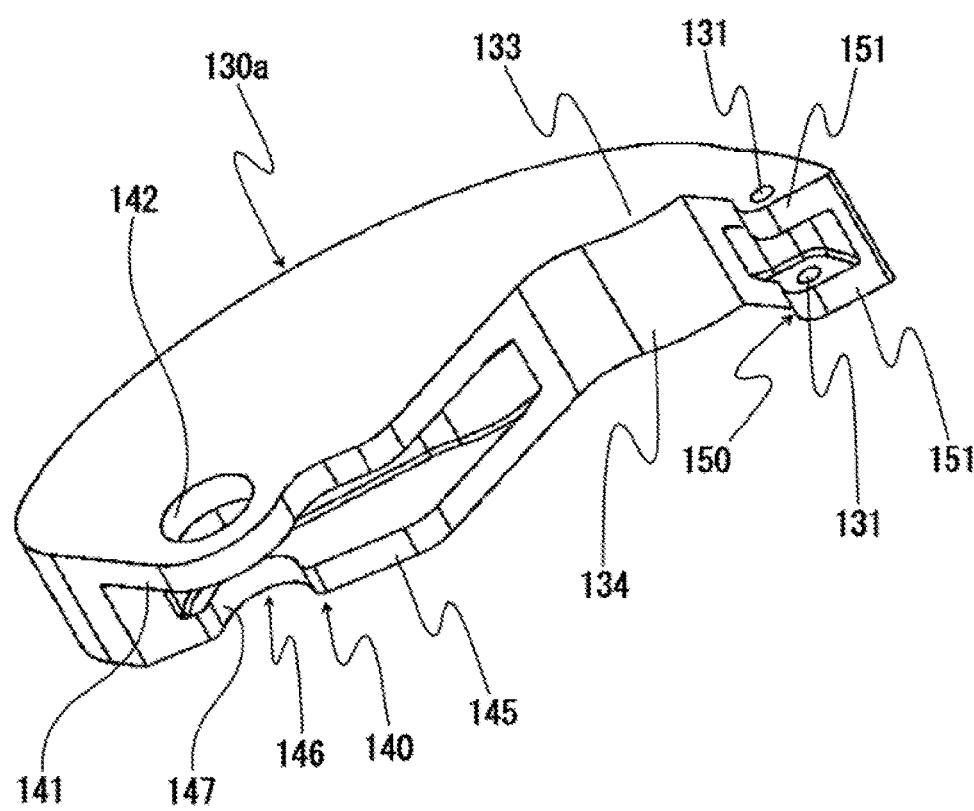
FIG. 11 is a perspective view of a guide lever according to the second embodiment of the present invention.

The guide lever 130a has a locking plate receiving part 150 for the locking plate 125a of the tensioner body 110a to fit in on the opposite side of the plunger abutment part 133 from the pivot support part 140, as shown in FIG. 11, in addition to the configuration of the guide lever 130 of the chain tensioner 100 according to the first embodiment.

The locking plate receiving part 150 has a pair of guide plate portions 151, 151 opposite each other such that they sandwich the locking plate 125a.

The chain tensioner 100a of this embodiment is provided with a body-side fixing pin hole 115 for a stopper pin P to pass through in the locking plate 125a of the tensioner body 110a, lever-side fixing pin holes 131, 131, one each in each of the pair of guide plate portions 151, 151 of the guide lever 130a, which come to be coaxial with the body-side fixing pin hole 115 at a predetermined pivoting position.

As shown in FIG. 8 and FIG. 9, the chain tensioner 100a of this embodiment is configured such that both the plunger 112 and the guide lever 130a can be fixed to the tensioner body 110a during assembly, storage, transport and so on, with the stopper pin P being inserted to the body-side fixing pin hole 115 and the lever-side fixing pin holes 131, 131.

More specifically, to assemble the chain tensioner 100a according to the second embodiment of the present invention, the first shaft 122 of the pivot part 121 is fitted in the mating hole 142 from one side at an angular position where the guide part 146 does not interfere with the arm part 120, and the guide lever 130a is mounted to the tensioner body 110a, with the semi-circular guide surface 147 of the guide part 146 being in contact with the second shaft 123 of the pivot part 121. The guide lever 130a is then rotated onto the plunger 112 so that the pair of guide plate portions 151, 151 are positioned on both sides of the locking plate 125a, and at the same time the lever-side fixing pin holes 131, 131 are aligned coaxially with the body-side fixing pin hole 115. In this state, the stopper pin P is inserted to the body-side fixing pin hole 115 and the lever-side fixing pin holes 131, 131, so that the guide lever 130a is locked to the tensioner body 110a by the stopper pin P, and the guide lever 130a retains the plunger 112 compressed.

Embodiment 3

The chain tensioner according to a third embodiment of the present invention has substantially the same configuration as that of the chain tensioner 100 according to the first embodiment described above except that the stopper pin retains the guide lever in a different position.

Figure 12:
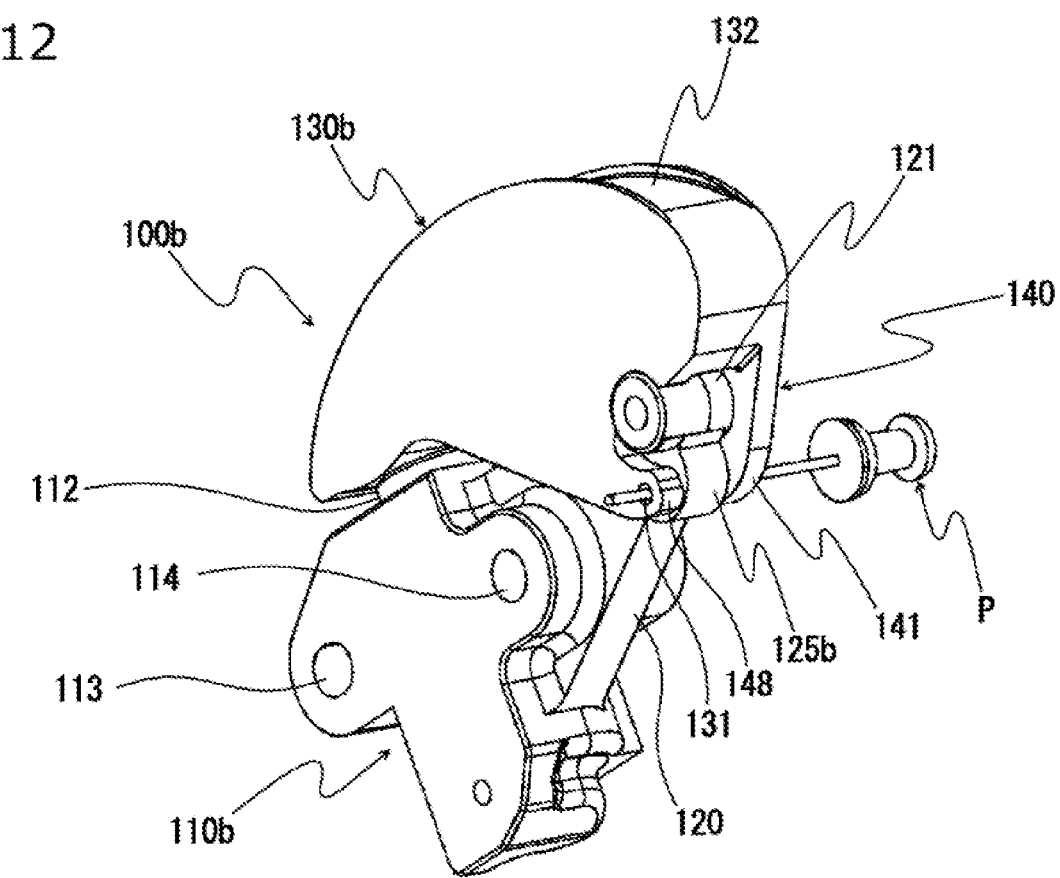
FIG. 12 is a perspective view of the chain tensioner viewed from the back according to a third embodiment of the present invention.
Figure 13:
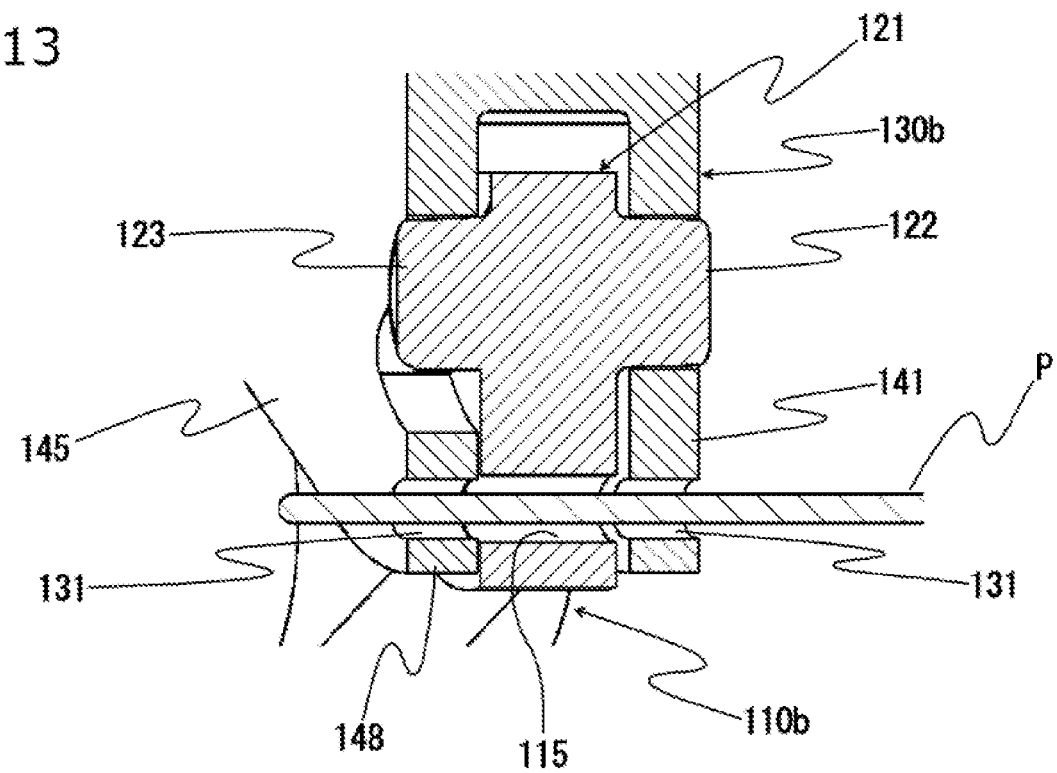
FIG. 13 is a cross-sectional perspective view illustrating part of the chain tensioner according to the third embodiment of the present invention.

In the chain tensioner 100b according to the third embodiment, as shown in FIG. 12 and FIG. 13, the stopper pin P for retaining the guide lever 130b is positioned near the pivot part 121 of the arm part 120.

Figure 14:
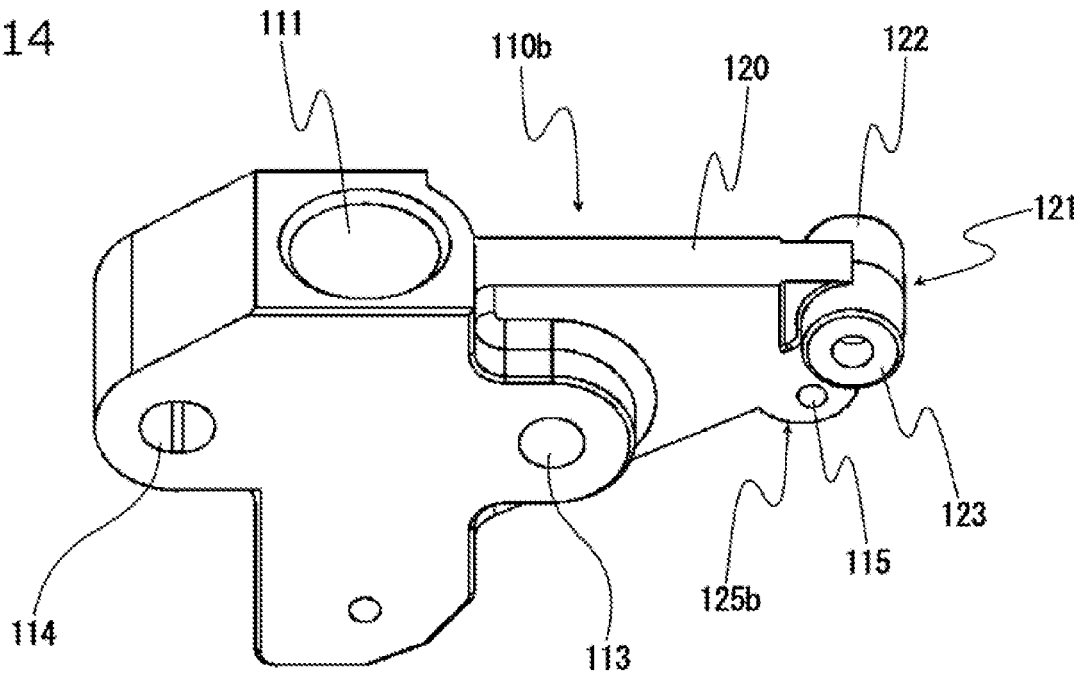
FIG. 14 is a perspective view of a tensioner body according to the third embodiment of the present invention.

The tensioner body 110b includes a semi-circular locking plate 125b protruding outward below the pivot part 121 as shown in FIG. 14, in addition to the configuration of the tensioner body 110 of the chain tensioner 100 according to the first embodiment.

Figure 15:
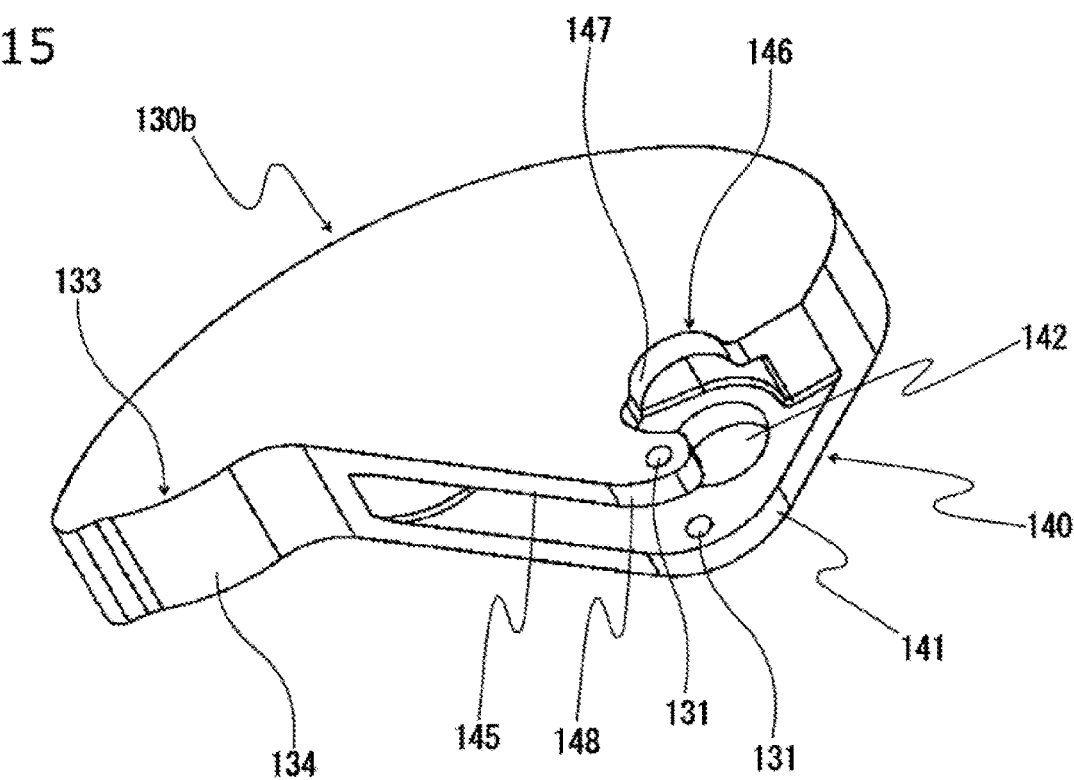
FIG. 15 is a perspective view of a guide lever according to the third embodiment of the present invention.

The guide lever 130b has a protruding portion 148 projecting downward and sideward continuously from the guide part 146 in the other guide plate portion 145 that forms part of the pivot support part 140, as shown in FIG. 15, in addition to the configuration of the guide lever 130 of the chain tensioner 100 according to the first embodiment.

The chain tensioner 100b of this embodiment is provided with a body-side fixing pin hole 115 for a stopper pin P to pass through in the locking plate 125b of the tensioner body 110b. The guide lever 130b is provided with lever-side fixing pin holes 131, 131, which come to be coaxial with the body-side fixing pin hole 115 at a predetermined pivoting position, one each in the protruding portion 148 of the other guide plate portion 145 and in an end portion of the one guide plate portion 141 below the mating hole 142. Namely, the lever-side fixing pin holes 131 are provided in the pivot support part 140 of the guide lever 130b.

As shown in FIG. 12 and FIG. 13, the chain tensioner 100b of this embodiment is configured such that both the plunger 112 and the guide lever 130b can be fixed to the tensioner body 110b during assembly, storage, transport and so on, with the stopper pin P being inserted to the body-side fixing pin hole 115 and the lever-side fixing pin holes 131, 131.

More specifically, to assemble the chain tensioner 100b according to the third embodiment of the present invention, the first shaft 122 of the pivot part 121 is fitted in the mating hole 142 from one side at an angular position where the guide part 146 and the protruding portion 148 do not interfere with the arm part 120, and the guide lever 130b is mounted to the tensioner body 110b, with the guide surface 147 of the guide part 146 being in contact with the second shaft 123 of the pivot part 121. The guide lever 130b is then rotated onto the plunger 112 so that the lower end of one guide plate portion 141 and the protruding portion 148 of the other guide plate portion 145 are positioned on both sides of the locking plate 125b, and at the same time the lever-side fixing pin holes 131, 131 are aligned coaxially with the body-side fixing pin hole 115. In this state, the stopper pin P is inserted to the body-side fixing pin hole 115 and the lever-side fixing pin holes 131, 131, so that the guide lever 130b is locked to the tensioner body 110b by the stopper pin P, and the guide lever 130b retains the plunger 112 compressed.

Embodiment 4

The chain tensioner according to a fourth embodiment of the present invention has substantially the same configuration as that of the chain tensioner 100 according to the first embodiment described above except that the stopper pin retains the guide lever in a different position.

Figure 16:
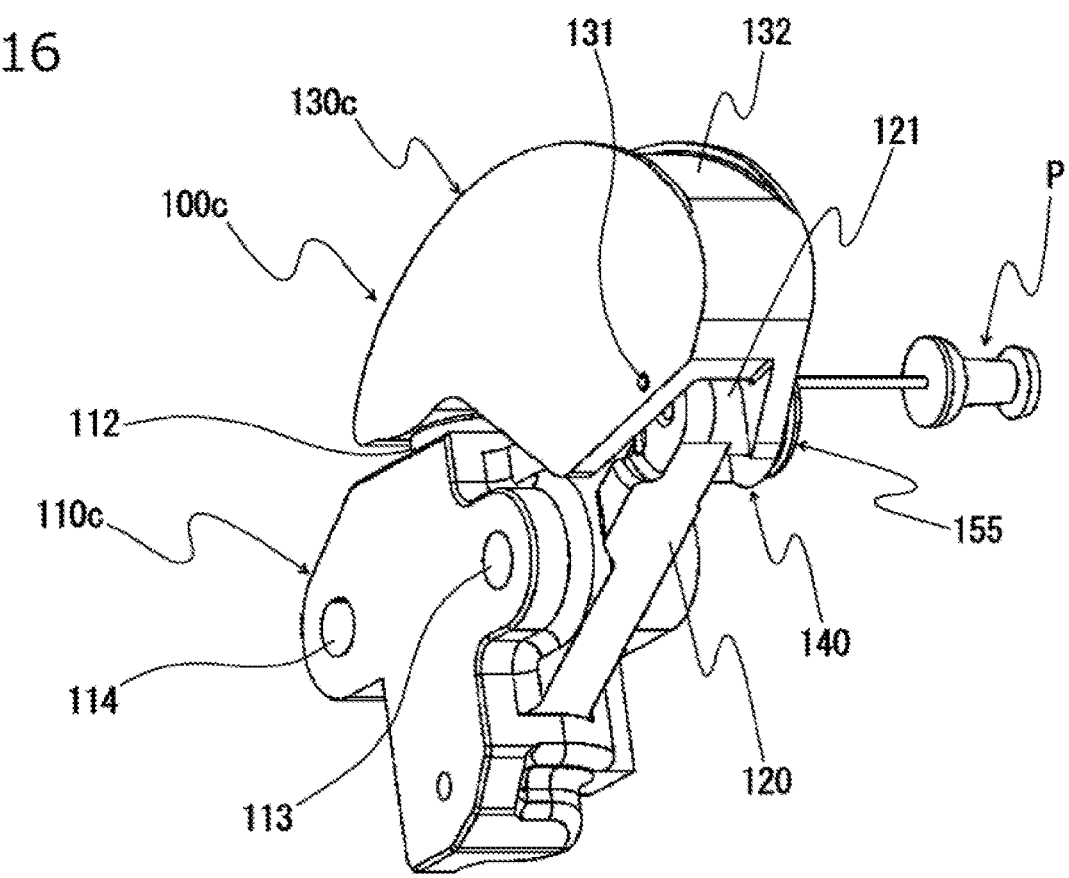
FIG. 16 is a perspective view of the chain tensioner viewed from the back according to a fourth embodiment of the present invention.
Figure 17:
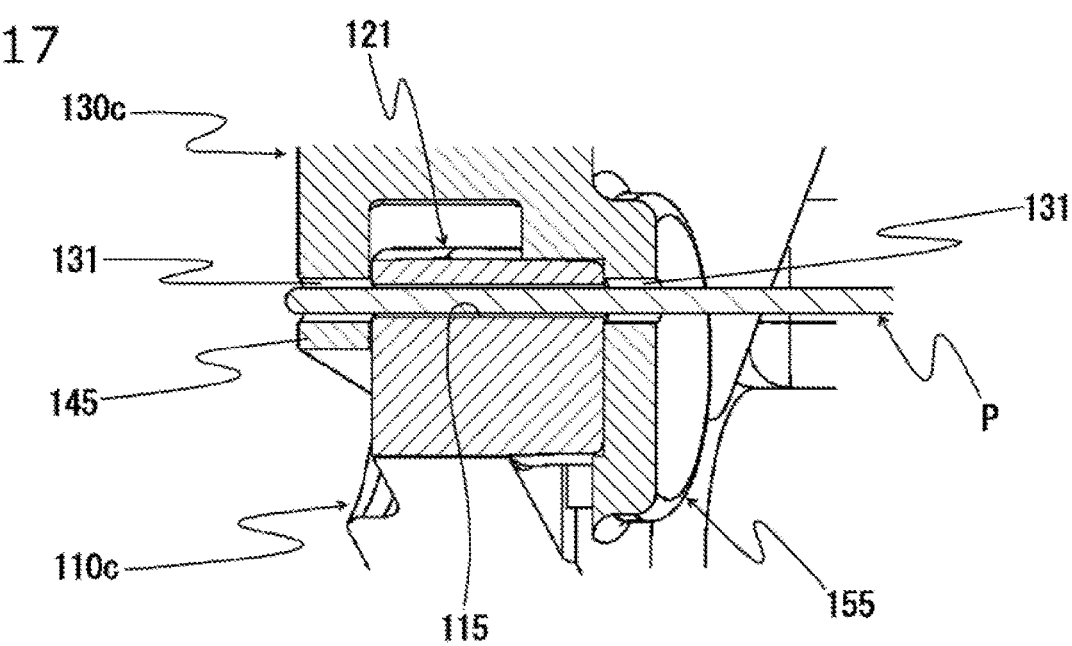
FIG. 17 is a cross-sectional perspective view illustrating part of the chain tensioner according to the fourth embodiment of the present invention.

In the chain tensioner 100c according to the fourth embodiment, as shown in FIG. 16 and FIG. 17, the stopper pin P retains the guide lever 130c at a point corresponding to the pivot part 121 of the arm part 120.

Figure 18:
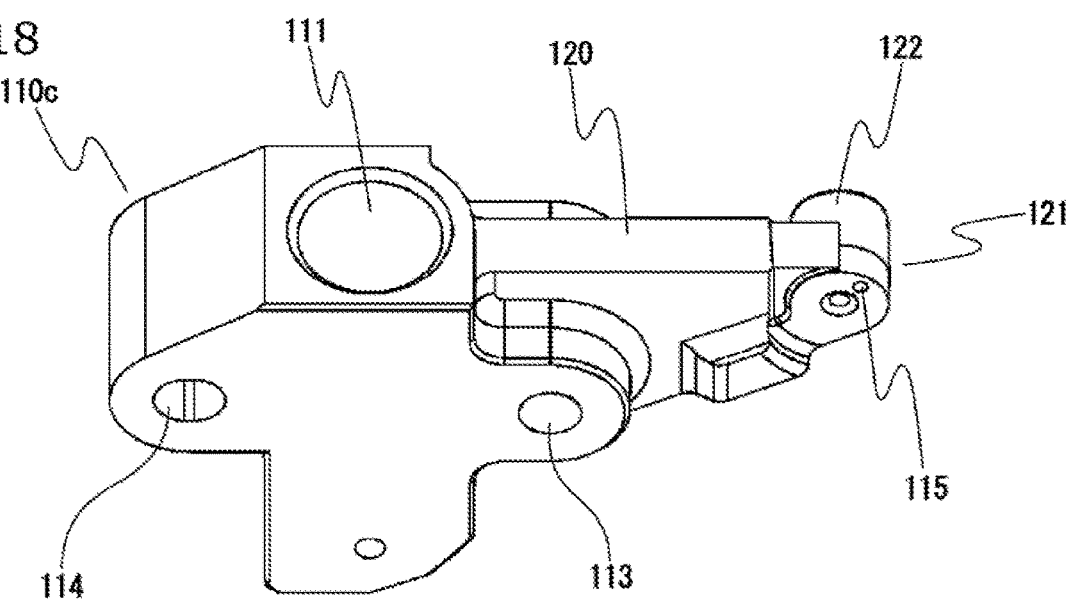
FIG. 18 is a perspective view of a tensioner body according to the fourth embodiment of the present invention.

The tensioner body 110c has substantially the same configuration as the tensioner body 110 of the chain tensioner 100 according to the first embodiment except that the pivot part 121 does not have the second shaft, as shown in FIG. 18.

Figure 19:
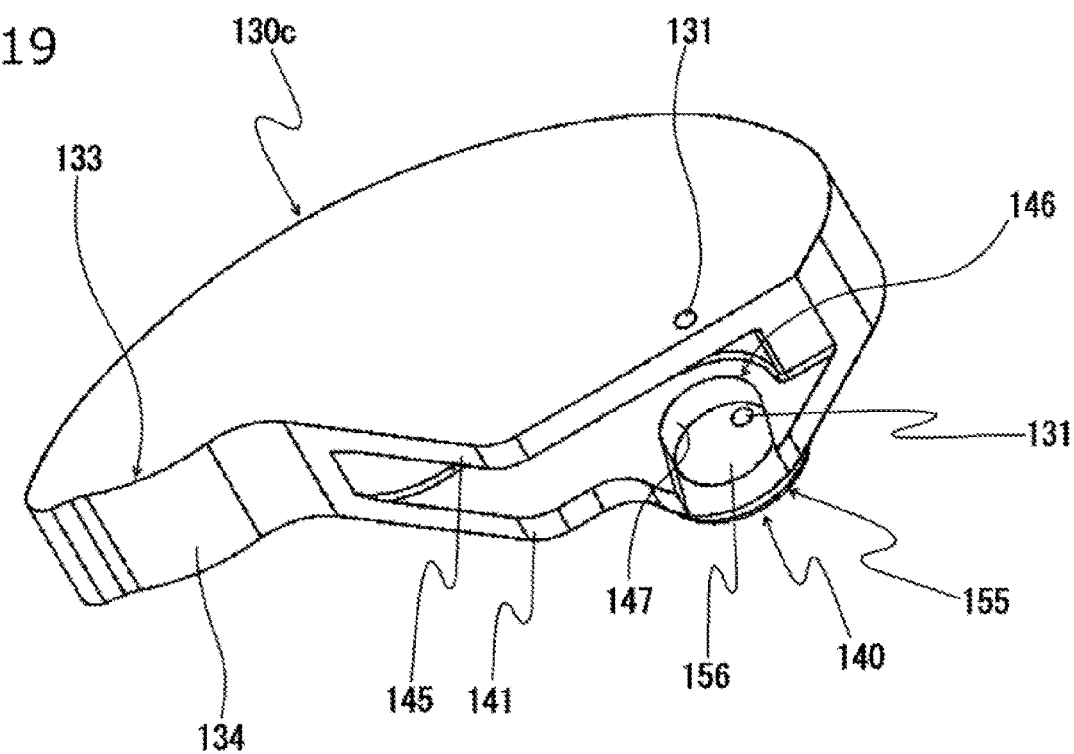
FIG. 19 is a perspective view of a guide lever according to the fourth embodiment of the present invention.

The guide lever 130c has a guide part 146 that is guided by part of the first shaft 122 of the pivot part 121 in one guide plate portion 141 that forms part of the pivot support part 140, as shown in FIG. 19. The guide part 146 has a semi-circular guide surface 147 that directly abuts on the first shaft 123 and is guided as it slides thereon, with an open lower end. A disc-shaped closure 155 is provided on the outer face of one guide plate 141 for closing the opening of the guide part 146. A spot faced hole 156 is formed on the inner side of the closure 155 for receiving the end of the first shaft 123 so that the first shaft 123 is rotatably supported.

The chain tensioner 100c of this embodiment is provided with a body-side fixing pin hole 115 for a stopper pin P to pass through in the pivot part 121 of the tensioner body 110b at a point eccentric to its pivot center. The guide lever 130c is provided with lever-side fixing pin holes 131, 131, which come to be coaxial with the body-side fixing pin hole 115 at a predetermined pivoting position, in the closure 155 and in the other guide plate portion 145.

As shown in FIG. 16 and FIG. 17, the chain tensioner 100c of this embodiment is configured such that both the plunger 112 and the guide lever 130c can be fixed to the tensioner body 110c during assembly, storage, transport and so on, with the stopper pin P being inserted to the body-side fixing pin hole 115 and the lever-side fixing pin holes 131, 131.

More specifically, to assemble the chain tensioner 100c according to the fourth embodiment of the present invention, the guide part 146 is fitted onto the first shaft 122 of the pivot part 121 from above at an angular position where the other guide plate portion 145 does not interfere with the arm part 120, and the guide lever 130c is mounted to the tensioner body 110c, with the first shaft 122 being supported in the spot faced hole 156 of the closure 155. The guide lever 130c is then rotated onto the plunger 112 so that the other guide plate portion 145 and the closure 155 are positioned on both sides of the pivot part 121, and at the same time the lever-side fixing pin holes 131, 131 are aligned coaxially with the body-side fixing pin hole 115. In this state, the stopper pin P is inserted to the body-side fixing pin hole 115 and the lever-side fixing pin holes 131, 131, so that the guide lever 130c is locked to the tensioner body 110c by the stopper pin P, and the guide lever 130c retains the plunger 112 compressed.

Embodiment 5

The chain tensioner according to a fifth embodiment of the present invention has substantially the same configuration as that of the chain tensioner 100 according to the first embodiment described above except that the guide lever is fixed by the stopper pin in a different manner.

Figure 20:
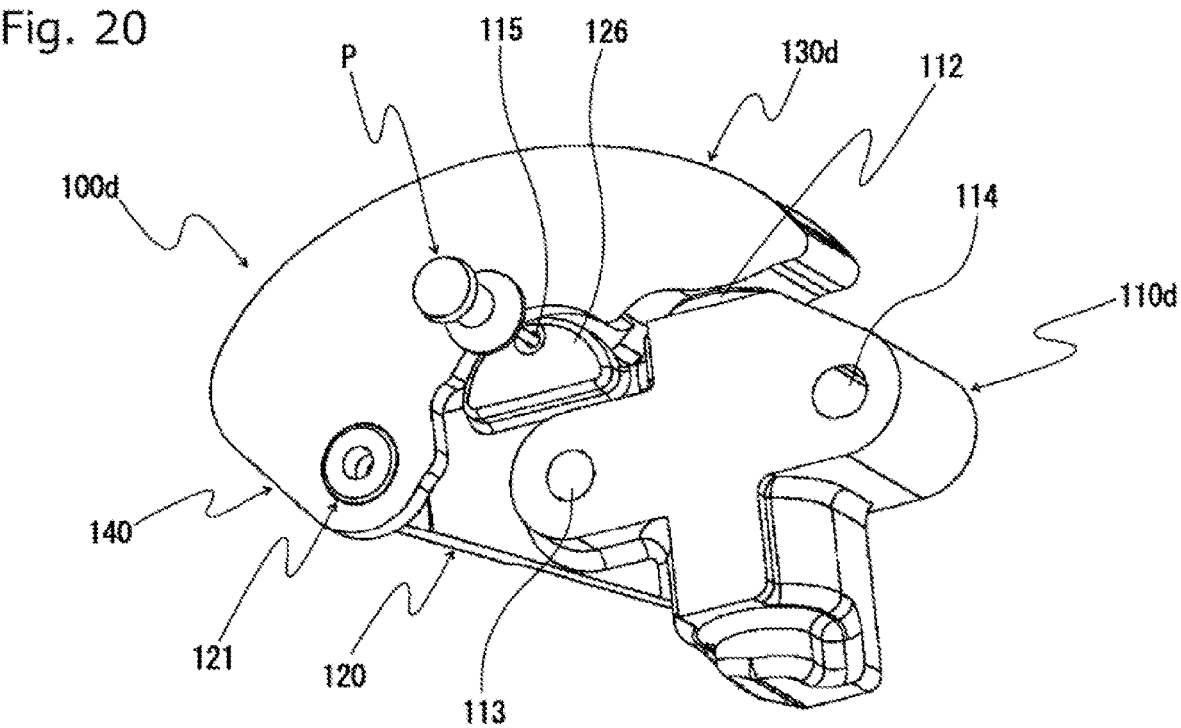
FIG. 20 is a perspective view of a chain tensioner viewed from the back according to a fifth embodiment of the present invention.
Figure 21:
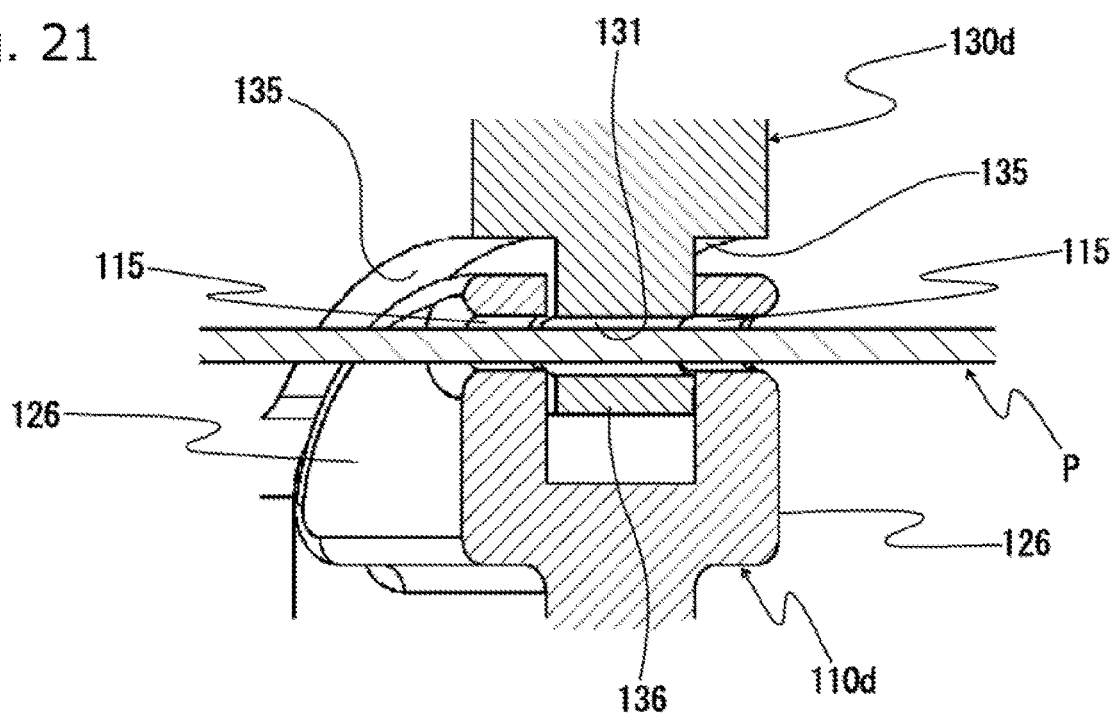
FIG. 21 is a cross-sectional perspective view illustrating part of the chain tensioner according to the fifth embodiment of the present invention.

The chain tensioner 100d according to the fifth embodiment, as shown in FIG. 20 and FIG. 21, is configured such that body-side fixing pin holes 115, 115 provided in the tensioner body 110d are positioned such as to sandwich the lever-side fixing pin hole 131 provided in the guide lever 130d, so that both the plunger 112 and the guide lever 130d can be fixed to the tensioner body 110d by inserting the stopper pin P into the body-side fixing pin holes 115, 115 and the lever-side fixing pin hole 131.

Figure 22:
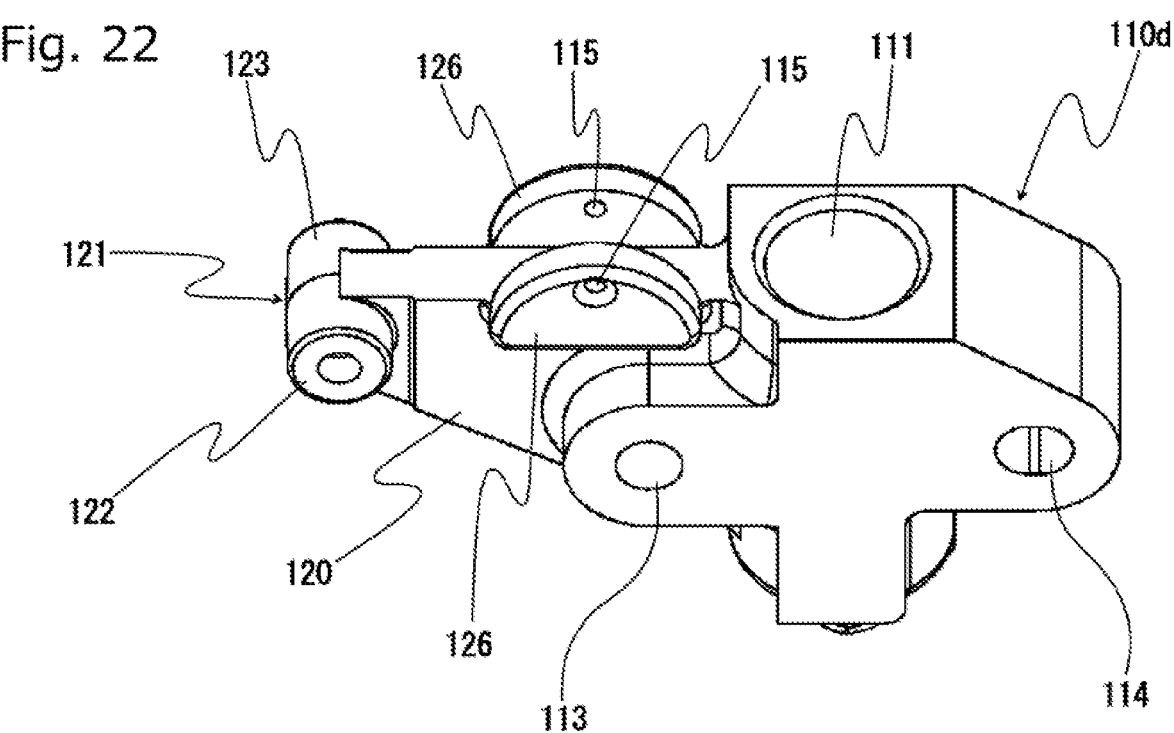
FIG. 22 is a perspective view of a tensioner body according to the fifth embodiment of the present invention.

The tensioner body 110d includes a pair of guide plate portions 126, 126 opposite each other on both sides of the arm part 120 between the plunger bore 111 and the pivot part 121, as shown in FIG. 22, in addition to the configuration of the tensioner body 110 of the chain tensioner 100 according to the first embodiment. The guide plate portions 126 are formed semi-circular, for example.

Figure 23:
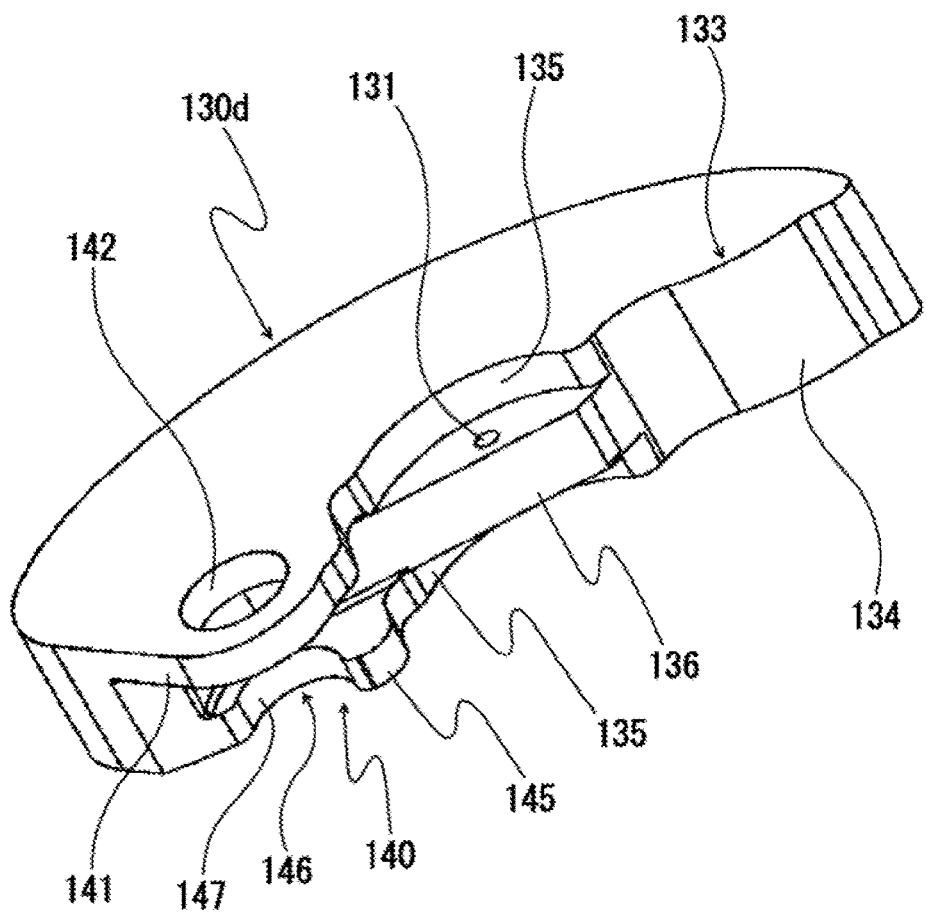
FIG. 23 is a perspective view of a guide lever according to the fifth embodiment of the present invention.

The guide lever 130d has, as shown in FIG. 23, guide plate receiving recesses 135, 135 having a spatial shape conforming to the shape of the guide plate portion 126, one each on the front side and backside, and a locking plate 136 that is the partition dividing the two guide plate receiving recesses 135, 135 and that will be interposed between the pair of guide plate portions 126, 126, in addition to the configuration of the guide lever 130 of the chain tensioner 100 according to the first embodiment.

The chain tensioner 100d of this embodiment is provided with body-side fixing pin holes 115, 115 for a stopper pin P to pass through, one each in each of the guide plate portions 126 of the tensioner body 110d, and a lever-side fixing pin hole 131, which comes to be coaxial with the body-side fixing pin holes 115, 115 at a predetermined pivoting position, in the locking plate 136 of the guide lever 130d.

To assemble the chain tensioner 100d according to the fifth embodiment of the present invention, the first shaft 122 of the pivot part 121 is fitted in the mating hole 142 from one side at an angular position where the guide part 146 does not interfere with the arm part 120, and the guide lever 130d is mounted to the tensioner body 110d, with the semi-circular guide surface 147 of the guide part 146 being in contact with the second shaft 123 of the pivot part 121. The guide lever 130d is then rotated onto the plunger 112 so that the pair of guide plate portions 126, 126 are positioned on both sides of the locking plate 136, and at the same time the lever-side fixing pin hole 131 is aligned coaxially with the body-side fixing pin holes 115, 115. In this state, the stopper pin P is inserted to the body-side fixing pin holes 115, 115 and the lever-side fixing pin hole 131, so that the guide lever 130d is locked to the tensioner body 110d by the stopper pin P, and the guide lever 130d retains the plunger 112 compressed.

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

While the chain tensioner according to the present invention is preferably used in a chain guide mechanism for maintaining correct tension in an endless chain passing over sprockets inside the engine room, it may be applied to any other purposes.

The tensioner may not necessarily be applied to a chain drive mechanism but also used for similar drive mechanisms that use belts, ropes and the like, and can be applied in a variety of industrial fields.

What is claimed is:

1. A chain tensioner comprising: a tensioner body having a plunger bore; a plunger slidably fitted in the plunger bore; an arm part provided to the tensioner body; and a guide lever pressed by the plunger and supported pivotably on the arm part, wherein
the arm part has a pivot part at a distal end thereof,
the guide lever has a pivot support part pivotally supported by the pivot part,
the tensioner body includes a body-side fixing pin hole positioned for a stopper pin to pass through without extending through the plunger,
the guide lever includes a lever-side fixing pin hole that comes to be coaxial with the body-side fixing pin hole at a predetermined pivoting position,
the body-side fixing pin hole and the lever-side fixing pin holes are configured to form a gap between an inner circumferential surface of each of the body-side fixing pin hole and the lever-side fixing pin holes and an outer peripheral surface of the stopper pin, and
the stopper pin is loosely fitted in the body-side fixing pin hole and the lever-side fixing pin holes.

2. The chain tensioner according to claim 1, wherein the body-side fixing pin hole is provided in the arm part of the tensioner body.

3. The chain tensioner according to claim 1, wherein the body-side fixing pin hole is provided on an opposite side of the plunger bore of the tensioner body from the arm part.

4. The chain tensioner according to claim 1, wherein the lever-side fixing pin hole is provided in the pivot support part of the guide lever.

5. The chain tensioner according to claim 4, wherein the body-side fixing pin hole is provided in the pivot part of the tensioner body.

6. The chain tensioner according to claim 1, wherein at least one of the body-side fixing pin hole and the lever-side fixing pin hole is coaxially positioned on both sides of the other.

* * * * *